United States Patent
Plüss

(10) Patent No.: US 9,924,302 B2
(45) Date of Patent: Mar. 20, 2018

(54) MOBILE COMMUNICATION DEVICE AND CLOUD-BASED COMPUTER SYSTEM

(71) Applicant: LEGIC Identsystems AG, Wetzikon (CH)

(72) Inventor: Marcel Plüss, Tann (CH)

(73) Assignee: LEGIC IDENTSYSTEMS AG (CH)

( * ) Notice: Subject to any disclaimer, the term of this patent is extended or adjusted under 35 U.S.C. 154(b) by 0 days.

(21) Appl. No.: 15/200,688

(22) Filed: Jul. 1, 2016

(65) Prior Publication Data

US 2017/0026781 A1  Jan. 26, 2017

(30) Foreign Application Priority Data

Jul. 23, 2015 (CH) ..................... 01077/15

(51) Int. Cl.
| | | |
|---|---|---|
| H04B 7/00 | (2006.01) |
| H04W 4/00 | (2018.01) |
| G06F 21/34 | (2013.01) |
| H04W 12/06 | (2009.01) |
| H04L 29/08 | (2006.01) |
| H04B 1/00 | (2006.01) |

(52) U.S. Cl.
CPC ............ *H04W 4/008* (2013.01); *G06F 21/34* (2013.01); *H04L 67/10* (2013.01); *H04W 12/06* (2013.01)

(58) Field of Classification Search
CPC ............ G06F 12/1475; G06K 7/10386; G06Q 20/351; H04L 63/10; H04M 1/7253; H04W 4/003; H04W 12/08

USPC .......................................... 455/410, 411, 558
See application file for complete search history.

(56) References Cited

U.S. PATENT DOCUMENTS

| | | | |
|---|---|---|---|
| 7,515,901 B1 | 4/2009 | Kaundinya | |
| 9,032,498 B1 | 5/2015 | Ayed | |
| 9,483,417 B2 * | 11/2016 | Pluss | .................. G06F 12/1475 |
| 2010/0327059 A1 | 12/2010 | Dean et al. | |
| 2011/0294418 A1 | 12/2011 | Chen | |
| 2013/0183936 A1* | 7/2013 | Smtih | .................. H04W 12/06 |
| | | | 455/411 |

FOREIGN PATENT DOCUMENTS

| | | | | |
|---|---|---|---|---|
| EP | 2809054 | * | 3/2014 | ............ H04M 1/725 |
| WO | WO-2012/037479 A1 | | 3/2012 | |

OTHER PUBLICATIONS

European Search Report dated Sep. 7, 2016 issued in related European Application No. 16173309.2-1853.

* cited by examiner

*Primary Examiner* — Lee Nguyen
(74) *Attorney, Agent, or Firm* — Ostrolenk Faber LLP

(57) ABSTRACT

A mobile communication device (1) comprises a transceiver (13) for wireless data exchange and a processor (12) connected to the transceiver (13). The processor (12) is programmed to implement a card reader agent (121) which is configured to enable authentication and access control protocols between a smart card module (122) and a virtual card reader (421, 421') which is arranged in a remote cloud-based computer center (1) by exchanging authentication and access control protocol data units between the smart card module (122) and the virtual card reader (421, 421') via a telecommunications network (3).

15 Claims, 4 Drawing Sheets

MOBILE COMMUNICATION DEVICE AND CLOUD-BASED COMPUTER SYSTEM

FIELD OF THE INVENTION

The present invention relates to a mobile communication device and a cloud-based computer system. Specifically, the present invention relates to a mobile communication device comprising a transceiver for wireless data exchange and a processor connected to the transceiver, and a cloud-based computer system comprising at least one processor.

BACKGROUND OF THE INVENTION

Mobile communication devices are increasingly equipped with transceivers for wireless data exchange with other electronic devices. Particularly, for close range communication, where the communicating devices are located at a distance from each other of only a few centimeters, e.g. 0 cm to 1.5 cm, mobile communication devices, such as mobile radio telephones, tablet computers, personal data assistant devices (PDA), or portable personal computers, are equipped with RF (Radio Frequency) communication modules, such as active RFID transceivers (Radio Frequency Identifier), passive RFID transceivers, active NFC transceivers (Near Field Communication) or passive NFC transceivers. As there is an established infrastructure of reader devices, for interacting with RFID transceivers implemented on chip cards, so called smartcards or Integrated Circuit Cards (ICC), as well as access rights management systems and protocols for RFID chip card applications such as cashless payment, accounting of printing & copying costs, access control, stand-alone locks, hotel and campus solutions, etc., related functions of smart card modules are increasingly implemented into mobile communication devices other than chip card devices, e.g. into mobile radio telephones, tablet computers, PDAs or portable personal computers. Thus, instead of carrying and using one or more smartcards, users may more conveniently use their other mobile communication devices, e.g. a mobile radio telephone, to interact with a card reader for traditional RFID chip card applications. However, because of the stringent security and access restrictions with regards to data and/or functional content of smartcard modules, applications of smart card modules are limited to interactions with dedicated (special purpose) external reader devices, separate from the mobile communication devices where the smart-card modules are implemented.

SUMMARY OF THE INVENTION

It is an object of this invention to provide a mobile communication device with a processor and a transceiver for wireless data exchange, and a cloud-based computer system, which mobile communication device and cloud-based computer system make it possible to overcome at least some of the disadvantages of the prior art. Particularly, it is an object of the present invention to provide a mobile communication device and a cloud-based computer system, which mobile communication device and cloud-based computer system facilitate applications of smart card modules that are not limited to interactions with dedicated (special purpose) external reader devices.

According to the present invention, these objects are achieved through the features of the independent claims. In addition, further advantageous embodiments follow from the dependent claims and the description.

A mobile communication device comprises a transceiver for wireless data exchange and a processor connected to the transceiver.

According to the present invention, the above-mentioned objects are particularly achieved in that the processor is programmed to implement a card reader agent. The card reader agent is configured to enable authentication and access control protocols between a smart card module and a virtual card reader, which virtual card reader is arranged in a remote cloud-based computer center, by exchanging via a telecommunications network authentication and access control protocol data units between the smart card module and the virtual card reader.

In an embodiment, the processor is further programmed to implement the card reader agent configured to transmit via the telecommunications network to the virtual card reader a request to access the smart card module. The request is related to reading data from the smart card module and/or writing data into the smart card module. The card reader agent is further configured to receive from the virtual card reader an access request for the smart card module via the telecommunications network, to forward the access request to the smart card module, to receive from the smart card module an access response, and to forward the access response from the smart card module via the telecommunications network to the virtual card reader.

In a further embodiment, the mobile communication device further comprises a display and the processor is further programmed to implement the card reader agent configured to receive via a an interface of the mobile communication device an external stimulus to access the smart card module, to transmit the request to access the smart card module to the virtual card reader in response to the external stimulus, to receive from the virtual card reader via the telecommunications network a data message in response to the access response from the smart card module forwarded to the virtual card reader, and to show the data message on the display.

In an embodiment, the processor is further programmed to implement the card reader agent configured to receive the external stimulus to access the smart card module via a user interface from a user of the mobile communication device.

In an embodiment, the processor is further programmed to implement the card reader agent configured to receive the external stimulus to access the smart card module via an RF communication module of the mobile communication device from an RFID tag.

In a further embodiment, the mobile communication device comprises more than one smart card modules and the processor is further programmed to implement the card reader agent configured to determine from the external stimulus a particular one of the smart card modules, and to transmit via the telecommunications network to the remote cloud-based computer center a request for a virtual card reader assigned to the particular one of the smart card modules to access the particular one of the smart card modules, the request being related to reading data from the particular one of the smart card modules and/or writing data into the particular one of the smart card modules.

In an embodiment, the processor is further configured to implement a virtual machine platform, the smart card module is a virtual card implemented as a program running on the virtual machine platform, and the card reader agent is configured to communicate with the smart card module via the virtual machine platform.

In a further embodiment, the smart card module is arranged externally to a housing of the mobile communication device and the processor is further programmed to implement the card reader agent configured to communicate via an RF communication module of the mobile communication device with the smart card module, and to relay the authentication and access control protocol data units between the smart card module and the virtual card reader via the RF communication module and the telecommunications network.

In addition to the mobile communication device, the present invention also relates to a cloud-based computer system, comprising at least one processor programmed to implement a virtual card reader configured to enable authentication and access control protocols between the virtual card reader and a smart card module which is in connection with a mobile communication device, remote from the cloud-based computer system, by exchanging authentication and access control protocol data units between the virtual card reader and the smart card module via a telecommunications network.

In an embodiment, the processor of the cloud-based computer system is further programmed to implement the virtual card reader configured to receive from the mobile communication device via the telecommunications network a request to access the smart card module, the request being related to reading data from the smart card module and/or writing data into the smart card module, to transmit via the telecommunications network to the mobile communication device an access request for the smart card module, and to receive from the mobile communication device via the telecommunications network an access response from the smart card module.

In a further embodiment, the processor of the cloud-based computer system is further programmed to implement a cloud application and to implement the virtual card reader configured to receive from the cloud application a request to access the smart card module for reading data from the smart card module and/or writing data into the smart card module, to transmit via the telecommunications network to the mobile communication device an access request for the smart card module, to receive from the mobile communication device via the telecommunications network an access response from the smart card module, and to transfer the access response to the cloud application.

In an embodiment, the processor of the cloud-based computer system is further programmed to implement the virtual card reader configured to generate a data message using the access response from the smart card module received from the mobile communication device, and to transmit the data message via the telecommunications network to the mobile communication device.

In a further embodiment, the processor of the cloud-based computer system is further programmed to implement more than one virtual card readers, to receive via the telecommunications network from the mobile communication device a request for one of the virtual card readers, which is assigned to a particular one of a plurality of smart card modules arranged in the mobile communication device, the request being related to reading data from the particular one of the smart card modules and/or writing data into the particular one of the smart card modules, and to forward the request to the one of the virtual card readers.

In addition to the mobile communication device and the cloud-based computer system, the present invention also relates to a computer program product comprising a non-transient computer-readable medium having stored thereon computer program code configured to control a processor of a mobile communication device, which mobile communication device comprises a transceiver for wireless data exchange, such that the processor implements a card reader agent configured to enable authentication and access control protocols between a smart card module and a virtual card reader, which is arranged in a remote cloud-based computer center, by exchanging via a telecommunications network authentication and access control protocol data units between the smart card module and the virtual card reader.

In addition to the mobile communication device and the cloud-based computer system, the present invention also relates to a computer program product comprising a non-transient computer-readable medium having stored thereon computer program code configured to control a processor of a cloud-based computer system, such that the processor implements a virtual card reader configured to enable authentication and access control protocols between the virtual card reader and a smart card module, which is in connection with a mobile communication device, remote from the cloud-based computer system, by exchanging via a telecommunications network authentication and access control protocol data units between the virtual card reader and the smart card module.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
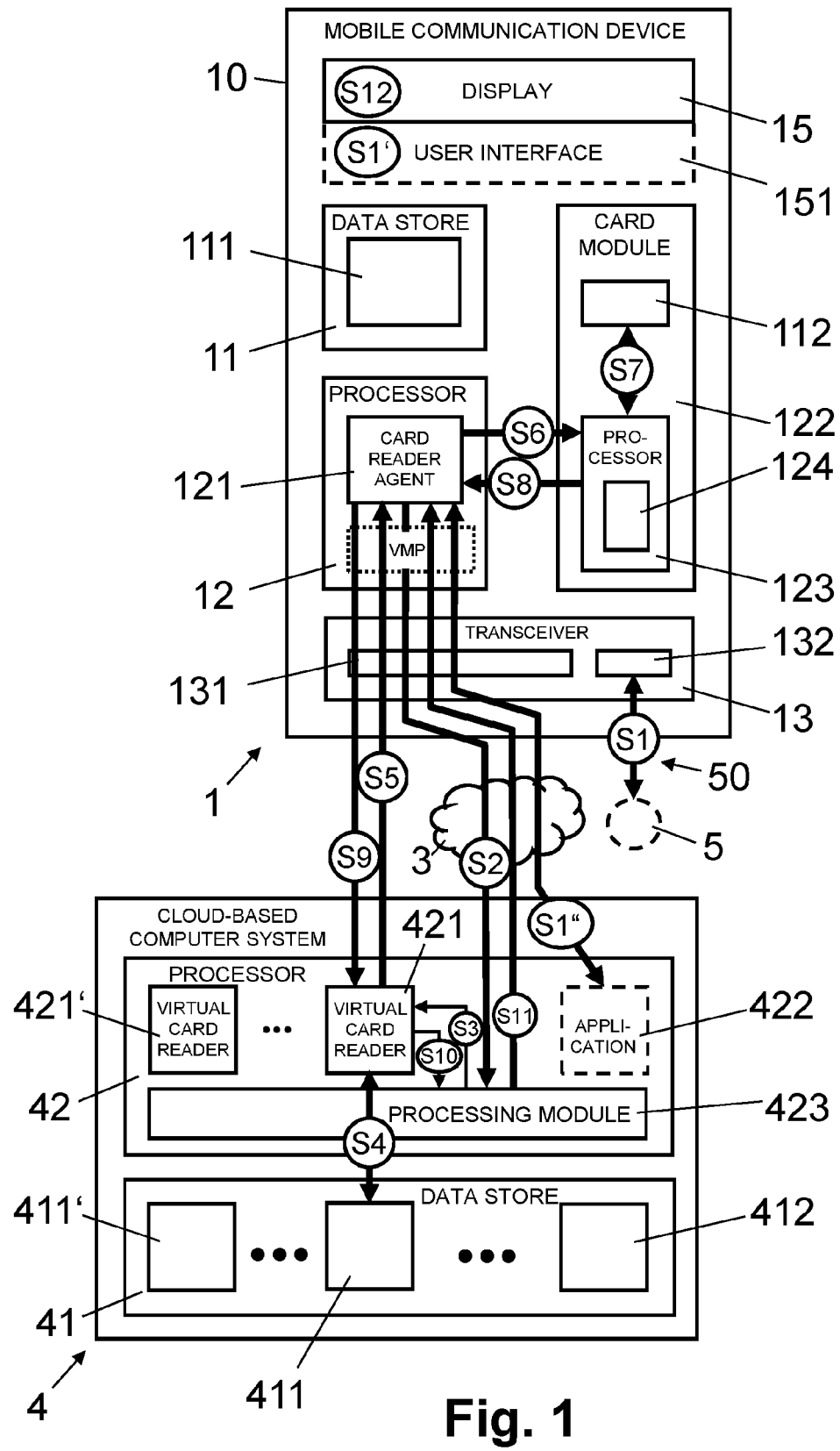
FIG. 1: shows a block diagram illustrating schematically a mobile communication device comprising a smart card module and a processor which is programmed to implement a card reader agent for facilitating communication between the smart card module and a cloud-based virtual card reader.

In FIGS. 1-4, reference numeral 1 refers to a mobile communication device which comprises a data store 11, a transceiver 13 for wireless data exchange with another electronic device, separate from the mobile communication device 1, and a processor 12 which is connected to the transceiver 13 and the data store 11. In an embodiment, the mobile communication device further comprises a display 15 connected to and controlled by the processor 12. Depending on the application and scenario, the mobile communication device 1 is implemented as mobile radio telephone or a mobile computer, such as a tablet computer, a PDA, or a portable personal computer. Reference number 151 refers to a user interface, including data entry keys and/or a touch sensors integrated in the display 15.

As illustrated in FIGS. 1-4, the mobile communication device 1 further comprises a card reader agent 121. The card reader agent 121 is implemented as a programmed software module comprising computer program code to control the processor 12 to perform various functions, described later in more detail. The computer program code is stored on a non-transient computer-readable medium which is part of or connected to the processor 12. Specifically, the computer program code is configured to control the processor 12 directly, by way of processor-specific instructions, or via an (intermediate) hardware abstraction layer, such as a virtual machine platform 123 (VMP), e.g. by way of interpretable instructions. The virtual machine platform 123, e.g. a Java Virtual Machine (JVM) or a Java Card Open Platform (JCOP) as specified by the GlobalPlatform association, is again implemented as a programmed software module comprising computer program code to control the processor 12.

For close range communication, the transceiver 13 comprises an RF (Radio Frequency) or Bluetooth communication module 132, e.g. an RFID transceiver (Radio Frequency Identifier), an NFC transceiver (Near Field Communication), or a Low Energy Bluetooth transceiver. For example, the RF communication module 132 is configured to interact with a contactless device according to a standardized RFID protocol as defined in standards such as ISO 18092, ISO 15693, or ISO 14443, or according to a proprietary data transmission or RFID protocol. For example, the RF communication module 132 is configured to operate at a carrier frequency in the range of 100 KHz to 2.5 GHz; particularly, the carrier frequency is set to the working frequency of an RFID system, e.g. 6.78 MHz, 13.56 MHz, or 27.12 MHz (or another multiple of 13.56 MHz).

For remote communication via a telecommunications network 3, the transceiver 13 comprises a mobile radio communication module 131, e.g. a WLAN module (Wireless Local Area Network), or a GSM (Global System for Mobile Communications) or UMTS (Universal Mobile Telecommunications System) module for GPRS (General Packet Radio Service), HSPA (High-Speed Packet Access), EDGE (Enhanced Data Rates for GSM Evolution), and/or LTE (Long Term Evolution), or another mobile radio data communication service. Specifically, the mobile radio communication module 131 enables the mobile communication device 1 to communicate via telecommunications network 3 with a cloud-based computer system 4.

The cloud-based computer system 4 comprises a plurality of computers comprising one or more processors 42 connected to a data store 41. As illustrated in FIGS. 1-4, the cloud-based computer system 4 further comprises several functional modules, including one or more virtual card readers 421, 421', one or more cloud-based applications 422, and a processing module 423. These functional modules are implemented as programmed software modules comprising computer program code to control the processor 42 to perform various functions, described later in more detail. The computer program code is stored on a non-transient computer-readable medium which is part of or connected to the processor 42.

Specifically, the virtual card readers 421, 421' or their computer program code, respectively, are configured to emulate the functions of a hardware-implemented card reader, e.g. a card reader for interacting with a device according to a standardized RFID protocol as defined in standards such as ISO 18092, ISO 21481, ISO 15693, or ISO 14443, or according to a proprietary data transmission or RFID protocol.

In FIGS. 1 to 4, reference numeral 411, 411' refers to reader data which is stored in the data store 41 and is accessible only for the respective virtual card readers 421, 421'.

In the embodiment and configuration shown in FIG. 1, the mobile communication device comprises a smart card module 122 implemented as a hardware chip card, e.g. a SIM card (Subscriber Identity Module), including a processor 123 and a data store 112 connected to the processor 123. As illustrated in FIG. 1, the smart card module 122 is arranged inside a housing 10 of the mobile communication device 1 and electrically connected to the mobile communication device 1. Specifically, the smart card module 122 is connected to processor 12 for data exchange.

Figure 2:
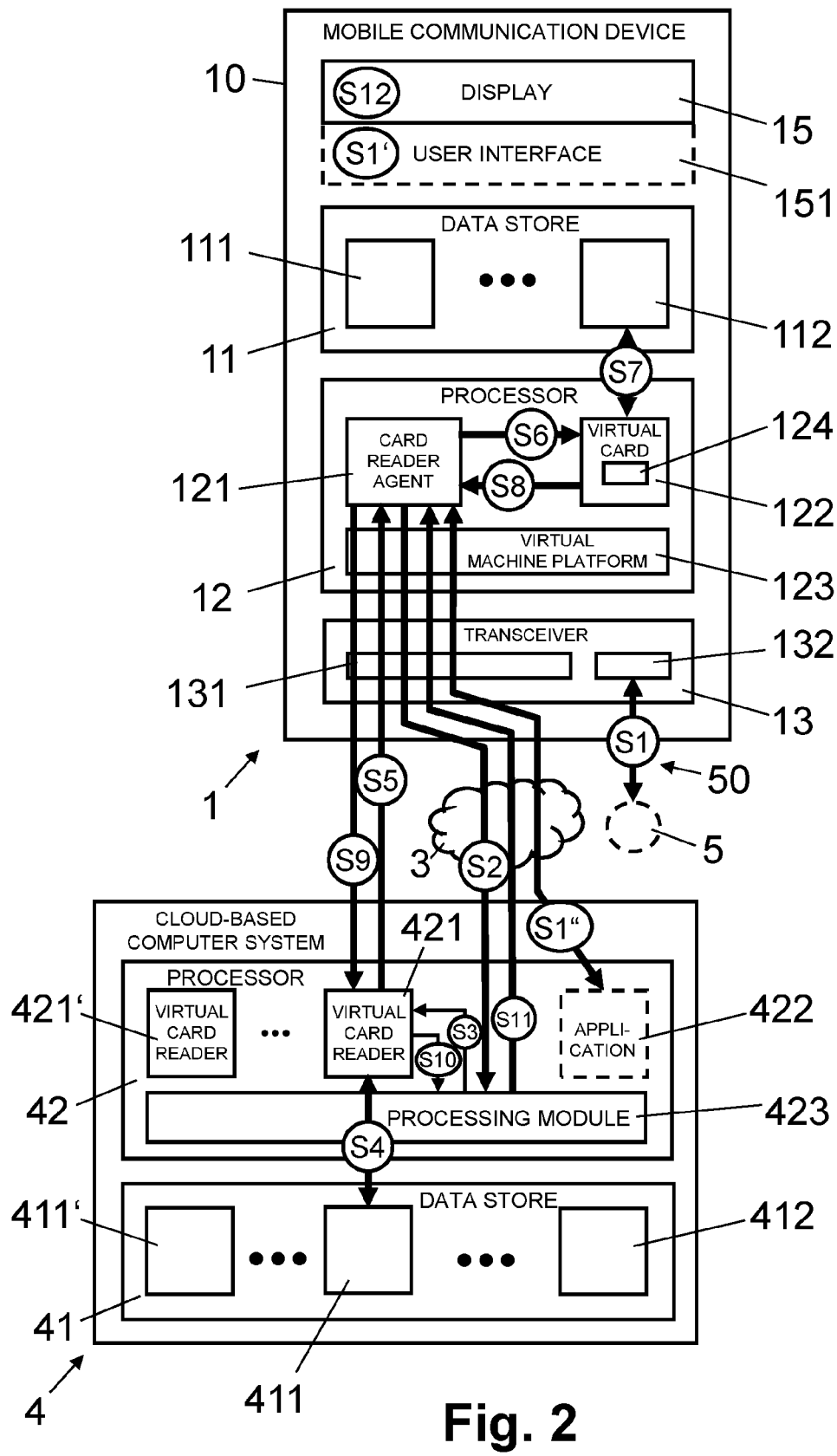
FIG. 2: shows a block diagram illustrating schematically a mobile communication device comprising a processor which is programmed to implement a virtual smart card module and a card reader agent for facilitating communication between the virtual smart card module and a cloud-based virtual card reader.

In the embodiment and configuration shown in FIG. 2, the mobile communication device comprises a smart card module 122 implemented as a virtual card (for convenience the hardware implemented smart card module of the mobile communication device 1 and its implementation as a virtual card are both denoted with reference numeral 122). As described above in the context of the virtual card readers 421, 421', the virtual card 122 is implemented as a programmed software module comprising computer program code which is stored on a non-transient computer-readable medium and configured to control the processor 12 directly, by way of processor-specific instructions, or via the hardware abstraction layer, e.g. by way of interpretable instructions. In an alternative embodiment, the virtual card 122 is implemented by way of VHDL (Very High Speed Integrated Circuit Hardware Description Language) or VHSIC Hardware Description Language running on a VHDL Simulator which is implemented on processor 12. The virtual card 122 is configured to emulate the functions of a hardware-implemented smart card, i.e. a chip card or integrated circuit card comprising a processor and memory (RAM, ROM), for example an RFID card for interacting with a card reader according to a standardized RFID protocol as defined in standards such as ISO 18092, ISO 21481, ISO 15693, or ISO 14443, or according to a proprietary data transmission or RFID protocol.

Figure 3:
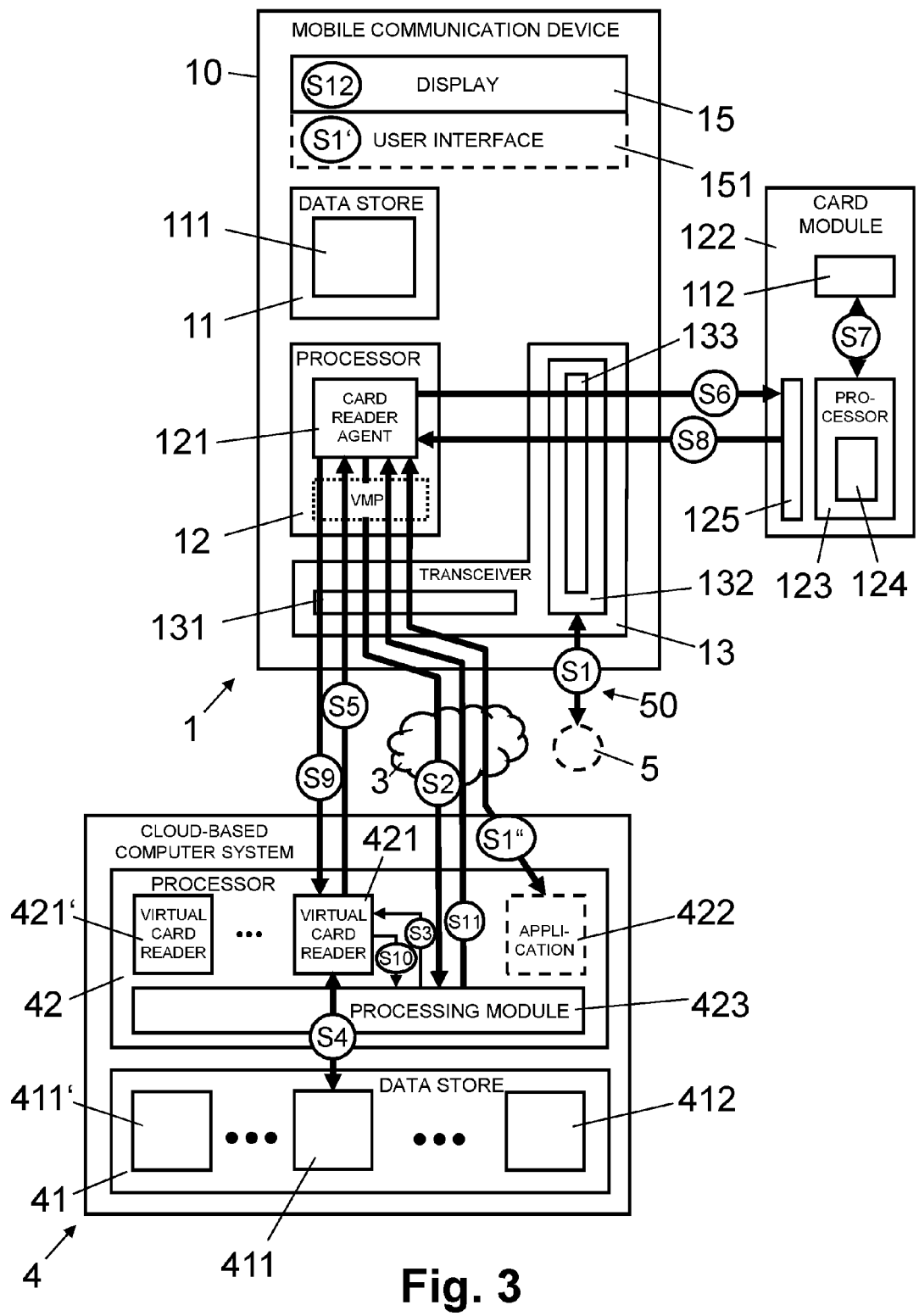
FIG. 3: shows a block diagram illustrating schematically a mobile communication device comprising a processor which is programmed to implement a card reader agent for facilitating communication between an external smart card module and a cloud-based virtual card reader.
Figure 4:
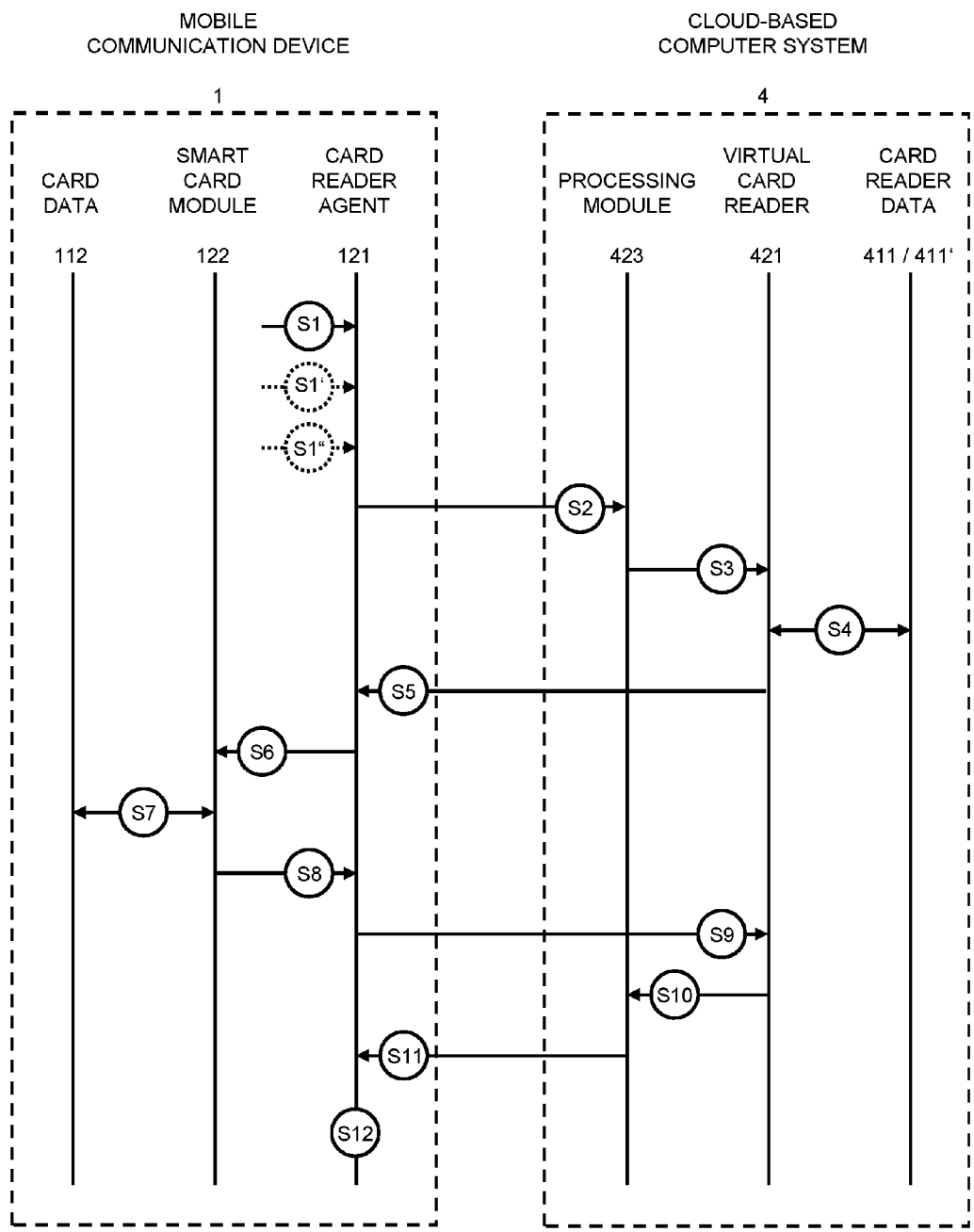
FIG. 4: shows a timing diagram illustrating an exemplary sequence of steps for communicating between a smart card module and a cloud-based virtual card reader.

In the embodiment and configuration shown in FIG. 3, the mobile communication device is in connection with a smart card module 122 implemented as a hardware chip card which is arranged outside the housing 10 of the mobile communication device 1. The external smart card module 122 includes a data store 112 with card data, a transceiver with an RF communication module 125 for wireless, close range communication, as described above in the context of RF communication module 132, and a processor 123 connected to the transceiver and the data store 112. As illustrated schematically in FIG. 3, the external smart card module 122 is in connection with the mobile communication device 1 or its processor 12, respectively, via an RFID or NFC interface 133, as described above in connection with the RFID and NFC transceivers of RF communication module 132.

In FIGS. 1 to 4, reference numeral 112 refers to card data (or its respective data store) which is accessible only to the smart card module 122. In the embodiment of FIG. 1, the card data is stored in a data store of the hardware implemented smart card module 122. In the embodiment of FIG. 2, the card data is stored in data store ii and is accessible only to the virtual card 122. In the embodiment of FIG. 3, the card data is stored in a data store of the hardware implemented external smart card module 122.

In FIGS. 1-3, reference numeral 124 refers to a card application. The card application 124 is implemented as a programmed software module comprising computer program code which is stored on a non-transient computer-readable medium and configured to control a processor to execute the card application. In the embodiment of FIG. 1, the card application 124 runs on processor 123 of the smart card module 122. In the embodiment of FIG. 2, the computer program code of the card application 124 is configured to control the processor 12 directly, by way of processor-specific instructions, or via the hardware abstraction layer, e.g. by way of interpretable instructions. In the embodiment of FIG. 3, the card application 124 runs on processor 123 of the external smart card module 122.

The virtual or hardware implemented smart card module 122 is configured to control access and execution of the card application 124 in adherence to respective standards and specifications for non-virtual (real) smart card modules, e.g. in accordance with specifications defined by the GlobalPlatform association for managing applications, the MULTOS (Multi Operating System) security standard for smart cards defined by the MULTOS Consortium, TCOS (TeleSec Chipcard Operating System) defined by T-Systems International GmbH of Deutsche Telekom AG, the EMV standard defined by Europay International (now MasterCard Europe), MasterCard and VISA, or MTSC (Master-Token System Control) defined by LEGIC Identsystems AG.

Although not illustrated explicitly in FIGS. 1-4, in different embodiments or configurations, the mobile communication device 1 comprises and/or is in connection with a plurality of smart card modules 122.

In the following paragraphs, exemplary sequences of steps performed for communicating and exchanging data between the various embodiments of smart card modules 122 of the mobile communication device 1 and the cloud-based virtual card readers 421, 421' are described with reference to FIGS. 1 to 4.

As illustrated in FIGS. 1 to 4, in initiating steps S1, S1' or S1", an external stimulus is generated and received by the card reader agent 121 via a an interface, the external stimulus requesting access to the smart card module 122, for reading data from the smart card module 122 or writing data into the smart card module 122. Reference numeral S1, refers to receiving the stimulus via RF communication module 132 from an external RF device 5, e.g. an RFID tag or a Bluetooth device. Reference numeral S1', refers to receiving the stimulus via a user interface 151 from a user of the mobile communication device 1. Reference numeral S1", refers to receiving the stimulus via telecommunications network 3 from cloud-based application 422.

In step S2, responsive to the received stimulus, the card reader agent 121 transmits via telecommunications network 3 to the cloud-based computer system 4 a request to access the smart card module 122 for reading data from the smart card module 122 and/or writing data into the smart card module 122. At the cloud-based computer system 4, the access request is received by processing module 423.

In step S3, the access request is forwarded by the processing module 423 to the virtual card reader 421, 421' assigned to the respective smart card module 122.

In step S4, responsive to the access request, for accessing the smart card module 122, the virtual card reader 421, 421' reads and retrieves from the card reader data 411 in the data store 41 the respective cryptographic keys and/or access rights for accessing the respective smart card module 122.

In step S5, the virtual card reader 421, 421' uses the cryptographic keys and/or access rights obtained in step S4 to access the smart card module 122.

One skilled in the art will understand that various standardized or proprietary cryptographic algorithms may be used to perform the authentication and access control protocols between the virtual card reader 421, 421' and smart card module 122. The virtual card reader 421, 421' and smart card module 122 are configured to perform the authentication and access control protocols in adherence to respective standards and specifications for non-virtual (real) smart card modules, e.g. in accordance with ISO 7816 and/or ISO 9798, as described by the GlobalPlatform association. Communication and interaction between the virtual card reader 421, 421' and the smart card module 122 is relayed via the card reader agent 121. Specifically, the virtual card reader 421, 421' uses the cryptographic keys and/or access rights to execute authentication and access control protocols between the virtual card reader 421, 421' and the smart card module 122.

The authentication and access control protocol data units exchanged between the smart card module 122 and the virtual card reader 421, 421' are relayed via the card reader agent 121. The same applies to protocol data units exchanged between the smart card module 122 and the virtual card reader 421, 421' in the context of read and write access requests and responses, respectively. In an embodiment, the protocol data units are exchanged through a secured communication tunnel established by the card reader agent 121 between the virtual card reader 421, 421' and the smart card module 122.

As illustrated in FIGS. 1-4, any exchange of request/response protocol data units between the virtual card reader 421, 421' and the smart card module 122 is performed, if initiated by the virtual card reader 421, 421', by transmitting a request protocol data unit in step S5 from the virtual card reader 421, 421' via telecommunications network 3 to the card reader agent 121, by forwarding the request protocol data unit in step S6 from the card reader agent 121 to the smart card module 122, by generating and transmitting in step S8 a response protocol data unit from the smart card module 122 to the card reader agent 121, and by forwarding the response protocol data unit in step S9 from the card reader agent 121 via telecommunications network 3 to the virtual card reader 421, 421'. One skilled in the art will understand, that a reverse sequence of steps is executed, if the exchange of request/response protocol data units is initiated by the smart card module 122.

In the embodiment and configuration shown in FIG. 1, the protocol data units exchanged in steps S6 and S8 between the card reader agent 121 and the smart card module 122 are transferred via a data bus connection between processor 12 and the internal hardware-implemented smart card module 122. In the embodiment and configuration shown in FIG. 2, the protocol data units exchanged in steps S6 and S8 between the card reader agent 121 and the virtual smart card module 122 are transferred via a software-implemented communication interface, e.g. via the virtual machine platform 123, specifically, via a communication interface implemented on the virtual machine platform 123. In the embodiment and configuration shown in FIG. 3, the protocol data units exchanged in steps S6 and S8 between the card reader agent 121 and the external smart card module 122 are transferred via the RFID or NFC interface 133.

Subsequently to step S5, in step S6, the card reader agent 121 forwards the access request received from the virtual card reader 421, 421' to the respective smart card module 122.

If the smart card module 122 verifies and confirms the authority and access rights used by the virtual card reader 421, 421' in step S5, the smart card module 122 performs the access request in step S7. Specifically, the smart card module 122 accesses the data store storing the card data 122 to execute a data read or data write request, i.e. it reads requested data from or writes supplied data into the respective data store of the smart card module 122. In the embodiment of FIG. 1, the processor 123 of the hardware implemented smart card module 122 accesses the card data stored in its data store 112. In the embodiment of FIG. 2, the virtual card 122 accesses the card data 112 stored in data store 11. In the embodiment of FIG. 3, the processor 123 of the hardware implemented external smart card module 122 accesses the card data stored in its data store 112. For access requests related to a specific application of the smart card module 122, interaction with the application is enabled, initiated and executed.

In step S8, the smart card module 122 generates and transmits to the card reader agent 121 a response protocol data unit with response data relating to the access request performed in step S7. In case of a read request, the response protocol data unit includes the data read from the data store 112. In case of a write request, the response protocol data unit includes a writing confirmation. In case of an access request related to a specific application of the smart card module 122, the response protocol data unit includes application specific data generated by application 124 of the smart card module 122.

In step S9, the card reader agent 121 forwards the response protocol data unit via telecommunications network 3 to the virtual card reader 421, 421'; specifically, to the virtual card reader 421, 421' from which the access request originated in step S5.

In step S10, the virtual card reader 421, 421' forwards the response protocol data unit or at least the response data included in the response protocol data unit to the processing module 423, in response to the access request received in step S3.

In step S11, in response to the access request received in step S2, the processing module 423 generates and transmits via telecommunications network 3 to the card reader agent 121 a request response. The request response includes a data message with the response data transmitted by the smart card module 122 via the card reader agent 121 to the virtual card reader 421, 421'. Depending on the scenario, if the request to access the smart card module originated from the cloud-based application 422, the processing module 423 transfers the request response to said cloud-based application 422.

In (optional) step S12, the card reader agent 121 shows on display 15 the response data received in step S11 from the cloud-based computer system 4. Specifically, the card reader agent 121 shows on display 15 data read from the smart card module 122, a write confirmation received from the smart card module 122, or application specific data received from application 124 of the smart card module 122.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A mobile communication device comprising a transceiver for wireless data exchange, and a processor connected to the transceiver, wherein the processor is programmed to implement a card reader agent configured to enable authentication and access control protocols between a smart card module and a virtual card reader which is arranged in a remote cloud-based computer center by exchanging authentication and access control protocol data units between the smart card module and the virtual card reader via a telecommunications network,
wherein the smart card module is enabled for authentication and access control protocols between the smart card module and an external reader device, said protocols being involved in interactions between the external reader device and a radio frequency transceiver including one of: an RFID transceiver, an NFC transceiver, and a Bluetooth Low Energy transceiver.

2. The mobile communication device of claim 1, wherein the processor is further programmed to implement the card reader agent configured to transmit via the telecommunications network to the virtual card reader a request to access the smart card module to perform at least one of: reading data from the smart card module and writing data into the smart card module, to receive from the virtual card reader an access request for the smart card module via the telecommunications network, to forward the access request to the smart card module, to receive from the smart card module an access response, and to forward the access response from the smart card module via the telecommunications network to the virtual card reader.

3. The mobile communication device of claim 2, wherein the mobile communication device further comprises a display; and the processor is further programmed to implement the card reader agent configured to receive via a an interface of the mobile communication device an external stimulus to access the smart card module, to transmit the request to access the smart card module to the virtual card reader in response to the external stimulus, to receive from the virtual card reader via the telecommunications network a data message in response to the access response from the smart card module forwarded to the virtual card reader, and to show the data message on the display.

4. The mobile communication device of claim 3, wherein the processor is further programmed to implement the card reader agent configured to receive the external stimulus to access the smart card module via a user interface from a user of the mobile communication device.

5. The mobile communication device of claim 3, wherein the processor is further programmed to implement the card reader agent configured to receive the external stimulus to access the smart card module via an RF communication module of the mobile communication device from an RFID tag.

6. The mobile communication device of claim 3, wherein the mobile communication device comprises more than one smart card modules; and the processor is further programmed to implement the card reader agent configured to determine from the external stimulus a particular one of the smart card modules, and to transmit via the telecommunications network to the remote cloud-based computer center a request for a virtual card reader assigned to the particular one of the smart card modules to access the particular one of the smart card modules to perform at least one of: reading data from the particular one of the smart card modules and writing data into the particular one of the smart card modules.

7. The mobile communication device of claim 1, wherein the processor is further configured to implement a virtual machine platform, the smart card module is a virtual card implemented as a program running on the virtual machine platform, and the card reader agent is configured to communicate with the smart card module via the virtual machine platform.

8. The mobile communication device of claim 1, wherein the smart card module is arranged externally to a housing of the mobile communication device; and the processor is further programmed to implement the card reader agent configured to communicate via an RF communication module of the mobile communication device with the smart card module, and to relay the authentication and access control protocol data units between the smart card module and the virtual card reader via the RF communication module and the telecommunications network.

9. A cloud-based computer system, comprising at least one processor programmed to implement a virtual card reader configured to enable authentication and access control protocols between the virtual card reader and a smart card module which is in connection with a remote mobile communication device by exchanging authentication and access control protocol data units between the virtual card reader and the smart card module via a telecommunications network, wherein the smart card module is enabled for authentication and access control protocols between the smart card module and an external reader device, said protocols being involved in interactions between the external reader device and a radio frequency transceiver including one of: an RFID transceiver, an NFC transceiver, and a Bluetooth Low Energy transceiver.

10. The cloud-based computer system of claim 9, wherein the processor is further programmed to implement the virtual card reader configured to receive from the mobile communication device via the telecommunications network a request to access the smart card module to perform at least one of: reading data from the smart card module and writing data into the smart card module, to transmit via the telecommunications network to the mobile communication device an access request for the smart card module, and to receive from the mobile communication device via the telecommunications network an access response from the smart card module.

11. The cloud-based computer system of claim 10, wherein the processor is further programmed to implement the virtual card reader configured to generate a data message using the access response from the smart card module received from the mobile communication device, and to transmit the data message via the telecommunications network to the mobile communication device.

12. The cloud-based computer system of claim 9, wherein the processor is further programmed to implement a cloud application and to implement the virtual card reader configured to receive from the cloud application a request to access the smart card module to perform at least one of: reading data from the smart card module and writing data into the smart card module, to transmit via the telecommunications network to the mobile communication device an access request for the smart card module, to receive from the mobile communication device via the telecommunications network an access response from the smart card module, and to transfer the access response to the cloud application.

13. The cloud-based computer system of claim 9, wherein the processor is further programmed to implement more than one virtual card readers, to receive via the telecommunications network from the mobile communication device a request for one of the virtual card readers, which is assigned to a particular one of a plurality of smart card modules arranged in the mobile communication device, to perform at least one of: reading data from the particular one of the smart card modules and writing data into the particular one of the smart card modules, and to forward the request to the one of the virtual card readers.

14. A computer program product comprising a non-transient computer-readable medium having stored thereon computer code configured to control a processor of a mobile communication device comprising a transceiver for wireless data exchange, such that the processor implements a card reader agent configured to enable authentication and access control protocols between a smart card module and a virtual card reader which is arranged in a remote cloud-based computer center by exchanging authentication and access control protocol data units between the smart card module and the virtual card reader via a telecommunications network, wherein the smart card module is enabled for authentication and access control protocols between the smart card module and an external reader device, said protocols being involved in interactions between the external reader device and a radio frequency transceiver including one of: an RFID transceiver, an NFC transceiver, and a Bluetooth Low Energy transceiver.

15. A computer program product comprising a non-transient computer-readable medium having stored thereon computer code configured to control a processor of a cloud-based computer system, such that the processor implements a virtual card reader configured to enable authentication and access control protocols between the virtual card reader and a smart card module which is in connection with a remote mobile communication device by exchanging authentication and access control protocol data units between the virtual card reader and the smart card module via a telecommunications network, wherein the smart card module is enabled for authentication and access control protocols between the smart card module and an external reader device, said protocols being involved in interactions between the external reader device and a radio frequency transceiver including one of: an RFID transceiver, an NFC transceiver, and a Bluetooth Low Energy transceiver.

* * * * *